US011829438B1

(12) United States Patent
Sanchez Rola (10) Patent No.: US 11,829,438 B1
(45) Date of Patent: Nov. 28, 2023

(54) SYSTEMS AND METHODS FOR REMOVING WHITESPACE FROM BLOCKED RESOURCES IN WEBSITES

(71) Applicant: GEN DIGITAL INC., Tempe, AZ (US)

(72) Inventor: Iskander Sanchez Rola, Antibes (FR)

(73) Assignee: GEN DIGITAL INC., Tempe, AZ (US)

(*) Notice: Subject to any disclaimer, the term of this patent is extended or adjusted under 35 U.S.C. 154(b) by 0 days.

(21) Appl. No.: 17/644,242

(22) Filed: Dec. 14, 2021

(51) Int. Cl.
*G06F 16/957* (2019.01)
*G06F 3/0481* (2022.01)
*G06F 16/951* (2019.01)
*G06F 16/958* (2019.01)
*G06F 3/0484* (2022.01)
*G06F 40/117* (2020.01)

(52) U.S. Cl.
CPC ........ *G06F 16/9577* (2019.01); *G06F 3/0481* (2013.01); *G06F 3/0484* (2013.01); *G06F 16/951* (2019.01); *G06F 16/958* (2019.01); *G06F 40/117* (2020.01)

(58) Field of Classification Search
CPC .. G06F 16/9577; G06F 16/958; G06F 40/117; G06F 3/0484
See application file for complete search history.

(56) References Cited

U.S. PATENT DOCUMENTS

| | | | |
|---|---|---|---|
| 9,208,316 B1* | 12/2015 | Hill | H04L 63/1416 |
| 2010/0211467 A1* | 8/2010 | Ramanathan | G06F 16/957 705/14.72 |
| 2015/0012363 A1* | 1/2015 | Grant | G06Q 30/0269 705/14.66 |
| 2015/0066665 A1* | 3/2015 | Long | G06Q 30/0277 705/14.73 |
| 2016/0140626 A1* | 5/2016 | Agarwal | G06Q 30/0276 715/234 |
| 2016/0182537 A1* | 6/2016 | Tatourian | H04L 63/145 726/23 |

* cited by examiner

*Primary Examiner* — Scott T Baderman
*Assistant Examiner* — Seung Woon Jung
(74) *Attorney, Agent, or Firm* — Greenberg Traurig, LLP (57) ABSTRACT

The disclosed computer-implemented method for removing whitespace from blocked resources in websites may include identifying elements arranged in a hierarchy from a website at least partially loaded in a browser and identifying one or more whitespace candidates to be displayed as whitespace in the browser. The method may also include selecting an element relating to the one or more whitespace candidates based on the hierarchy and establishing a mutation observer for monitoring a change in the selected element. The method may further include modifying a display attribute of the selected element based on the monitoring by the mutation observer. Various other methods, systems, and computer-readable media are also disclosed.

15 Claims, 7 Drawing Sheets

SYSTEMS AND METHODS FOR REMOVING WHITESPACE FROM BLOCKED RESOURCES IN WEBSITES

BACKGROUND

Modern websites include various advertisements that may be visually presented in prominent locations on the websites. As such advertisements become more sophisticated, users may become increasingly frustrated with advertisements that may affect their web browsing experience. Many browsers may use or allow usage of ad-blocking software to mitigate the prominence of such advertisements and improve users' experiences.

Ad-blocking software may be able to recognize which particular elements or resources on a website are advertisements and accordingly block those resources from being loaded. In order to minimize breaking a website's functionality, the ad-blocking software may leave the blocked resource as an empty element, resulting in the display of whitespace where the advertisement would have loaded. The user's browsing experience may be diminished due to the presence of whitespace in prominent locations on the website. In addition, many websites may utilize "lazy loading" (e.g., dynamically loading resources as needed after the initial loading of the website) such that removal of certain empty elements from a website may break its functionality.

The instant disclosure, therefore, identifies and addresses a need for systems and methods for removing whitespace from blocked resources in websites.

SUMMARY

As will be described in greater detail below, the instant disclosure describes various systems and methods for removing whitespace from blocked resources in websites.

In one example, a method for removing whitespace from blocked resources in websites may include (a) identifying a plurality of elements arranged in a hierarchy from a website at least partially loaded in a browser, (b) identifying, from the plurality of elements, one or more whitespace candidates to be displayed as whitespace in the browser, (c) selecting an element of the plurality of elements relating to the one or more whitespace candidates based on the hierarchy, (d) establishing a mutation observer for monitoring a change in the selected element, and (e) modifying a display attribute of the selected element based on the monitoring by the mutation observer.

In some examples, determining the one or more whitespace candidates may be based on identifying elements originating from a blocked domain. In some examples, determining the one or more whitespace candidates may be based on identifying elements covering a threshold amount of the website with whitespace. In some examples, determining the one or more whitespace candidates may be based on identifying elements having empty body content. In some examples, determining the one or more whitespace candidates may be based on identifying elements sharing a same class with an empty element.

In some examples, selecting the element may be based on selecting an element having children, based on the hierarchy, that may all be included in the one or more whitespace candidates. In such examples, selecting the element may include successively checking, starting from a highest level of the hierarchy, a lower level in the hierarchy to identify the element having children that are all included in the one or more whitespace candidates.

In some examples, the method may also include setting, via the mutation observer, the display attribute of the selected element to not display before the change is observed. In some examples, the method may also include setting, via the mutation observer, the display attribute of the selected element to display when the selected element loads a non-blocked content. In such examples, the method may further include disabling the mutation observer after the selected element loads the non-blocked content.

In one embodiment, a system for removing whitespace from blocked resources in websites may include several modules stored in memory, including an identification module, stored in memory, configured to identify a plurality of elements arranged in a hierarchy from a website at least partially loaded in a browser and identify, from the plurality of elements, one or more whitespace candidates to be displayed as whitespace in the browser, a selection module, stored in memory, configured to select an element of the plurality of elements relating to the one or more whitespace candidates based on the hierarchy, an observer module, stored in memory, configured to establish a mutation observer for monitoring a change in the selected element, a modification module, stored in memory, configured to modify a display attribute of the selected element based on the monitoring by the mutation observer, and at least one physical processor that executes the identification module, the selection module, the observer module, and the modification module.

In some examples, determining the one or more whitespace candidates may be based on identifying elements originating from a blocked domain. In some examples, determining the one or more whitespace candidates may be based on identifying elements covering a threshold amount of the website with whitespace. In some examples, determining the one or more whitespace candidates may be based on identifying elements having empty body content. In some examples, determining the one or more whitespace candidates may be based on identifying elements sharing a same class with an empty element.

In some examples, selecting the element may be based on selecting an element having children, based on the hierarchy, that are all included in the one or more whitespace candidates and, selecting the element may include successively checking, starting from a highest level of the hierarchy, a lower level in the hierarchy to identify the element having children that are all included in the one or more whitespace candidates.

In some examples, the modification module may be further configured to set, via the mutation observer, the display attribute of the selected element to not display before the change is observed. In some examples, the modification module may be further configured to set, via the mutation observer, the display attribute of the selected element to display when the selected element loads a non-blocked content, and disable the mutation observer after the selected element loads the non-blocked content.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (a) identify a plurality of elements arranged in a hierarchy from a website at least partially loaded in a browser, (b) identify, from the plurality of elements, one or more whitespace candidates to be displayed as whitespace in the browser, (c) select an element of the plurality of elements relating to the one or more whitespace candidates based on the hierarchy, (d) establish a mutation observer for monitoring a change in the selected element, and (e) modify a display attribute of the selected element based on the monitoring by the mutation observer.

In some examples, determining the one or more whitespace candidates may be based on at least one of: (i) identifying elements originating from a blocked domain, (ii) identifying elements covering a threshold amount of the website with whitespace, (iii) identifying elements having empty body content, or (iv) identifying elements sharing a same class with an empty element.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for removing whitespace from blocked resources in websites. As will be explained in greater detail below, by identifying potential whitespace elements from a website, selecting an element encompassing the potential whitespace elements, monitoring for changes in the selected element, and modifying a display attribute of the selected element, the systems and methods described herein may be able to improve the detection and removal of unnecessary whitespace in a website. By selecting a particular element and observing the selected element, the systems and methods described herein may mitigate removing necessary whitespace.

In addition, the systems and methods described may improve the functioning of a computing device by detecting unnecessary whitespace with increased accuracy and reducing the need to reload websites. These systems and methods may also improve the field of ad-blocking and web security by providing a scalable solution for removing whitespace.

The following will provide, with reference to FIGS. 1-7, detailed descriptions of example systems for removing whitespace from blocked resources in websites. Detailed descriptions of example systems will be provided in connection with FIGS. 1 and 2. Detailed descriptions of corresponding computer-implemented methods will also be provided in connection with FIG. 3. Detailed descriptions of example browser screens will be provided in connection with FIGS. 4A-B. Detailed descriptions of example element hierarchies will also be provided in connection with FIG. 5. In addition, detailed descriptions of an example computing system and network architecture capable of implementing one or more of the embodiments described herein will be provided in connection with FIGS. 6 and 7, respectively.

Figure 1:
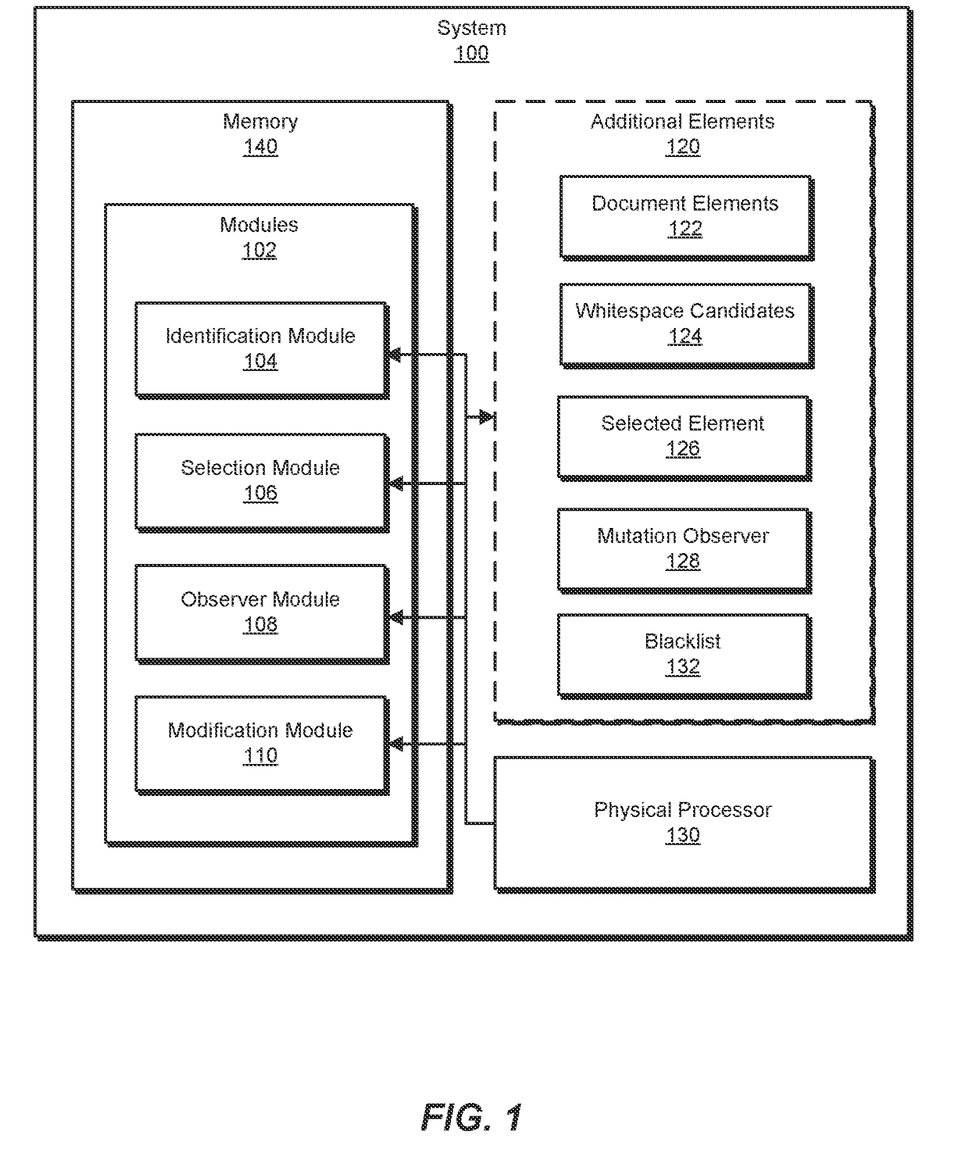
FIG. 1 is a block diagram of an example system for removing whitespace from blocked resources in websites.

FIG. 1 is a block diagram of an example system 100 for removing whitespace from blocked resources in websites. As illustrated in this figure, example system 100 may include one or more modules 102 for performing one or more tasks. As will be explained in greater detail below, modules 102 may include an identification module 104, a selection module 106, an observer module 108, and a modification module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate removing whitespace from blocked resources in websites. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as document elements 122, whitespace candidates 124, a selected element 126, a mutation observer 128, and a blacklist 132. Additional elements 120 generally represent any type or form of data and/or software modules, which in some examples may be stored in memory 140.

Figure 2:
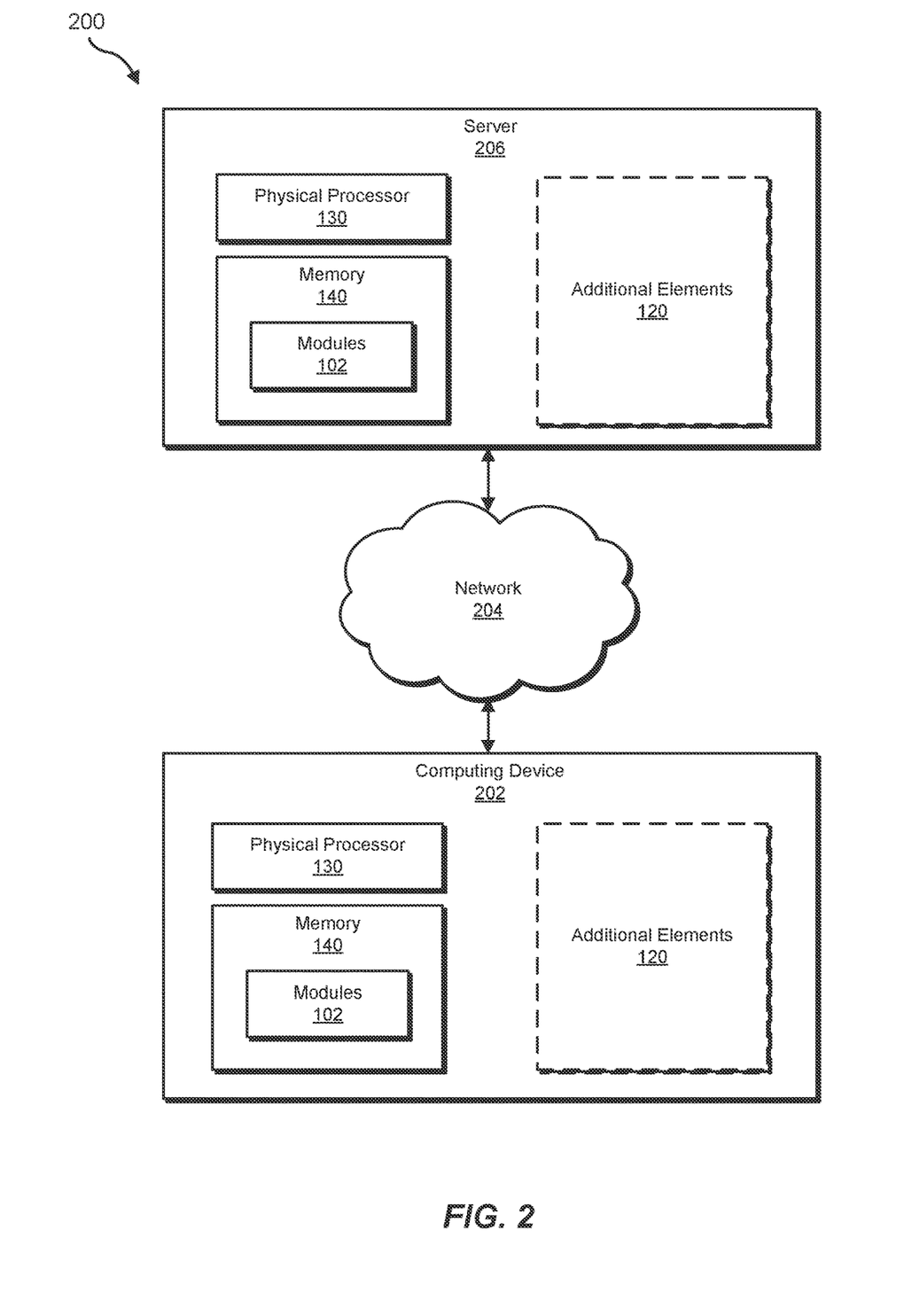
FIG. 2 is a block diagram of an additional example system for removing whitespace from blocked resources in websites.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to remove whitespace, as may be viewed in a browser, corresponding to blocked web resources. For example, and as will be described in greater detail below, one or more of modules 102 may cause computing device 202 and/or server 206 to identify whitespace candidates, select an element from a hierarchy of elements based on the whitespace candidates, establish a mutation observer for monitoring a change in the selected element, and modify a display attribute of the selected element based on the mutation observer.

Computing device 202 generally represents any type or form of computing device capable of reading computer-executable instructions. For example, computing device 202 may be a user device running a web browser. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of hosting security data. For example, server 206 may be a security server associated with a known secure domain. Additional examples of server 206 include, without limitation, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
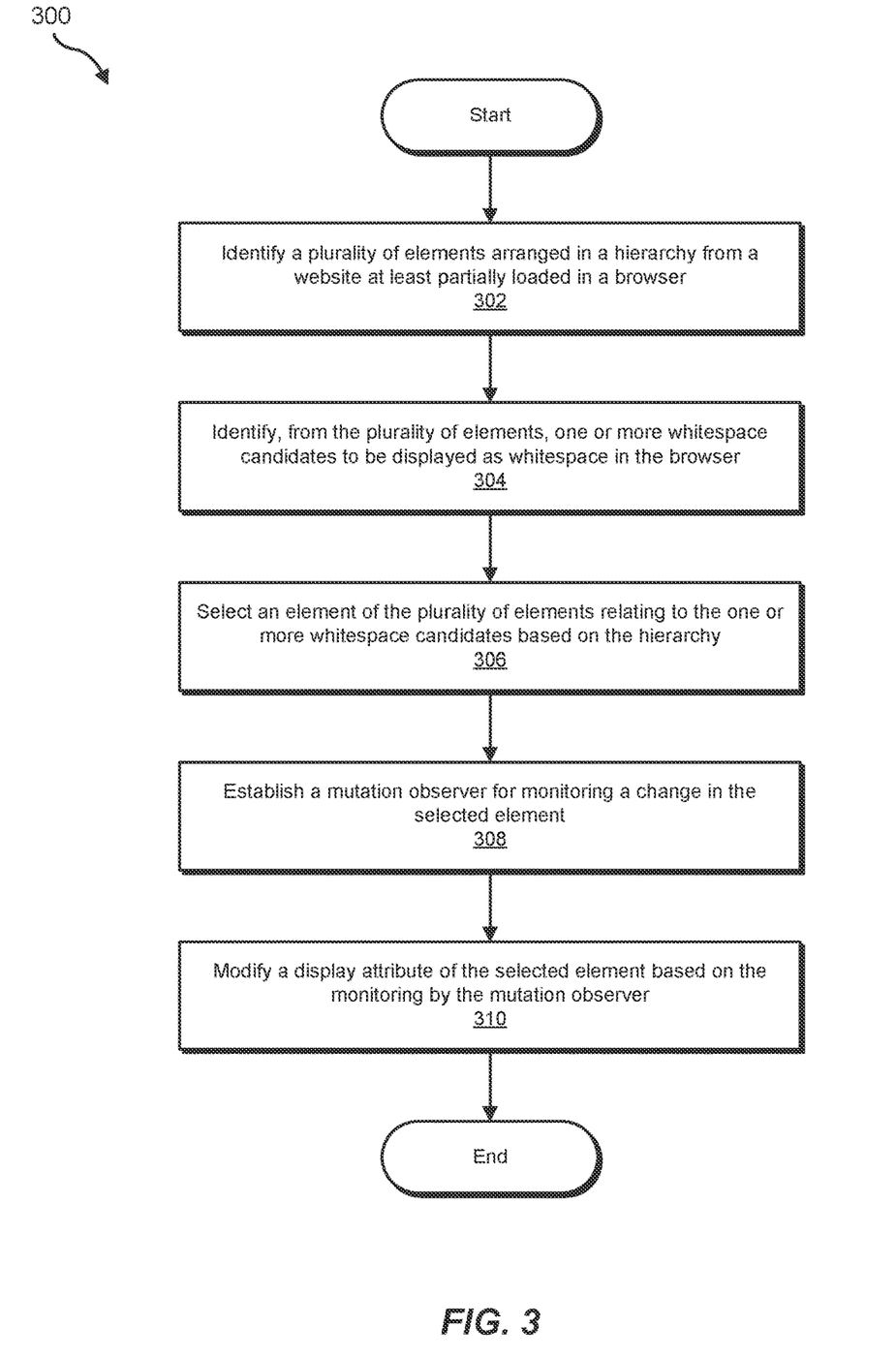
FIG. 3 is a flow diagram of an example method for removing whitespace from blocked resources in websites.

FIG. 3 is a flow diagram of an example computer-implemented method 300 for removing whitespace from blocked resources in websites. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a plurality of elements arranged in a hierarchy from a website at least partially loaded in a browser. For example, identification module 104 may, as part of computing device 202 in FIG. 2, identify document elements 122 from a website at least partially loaded in a browser and that may be arranged in a hierarchy.

Figure 4A:
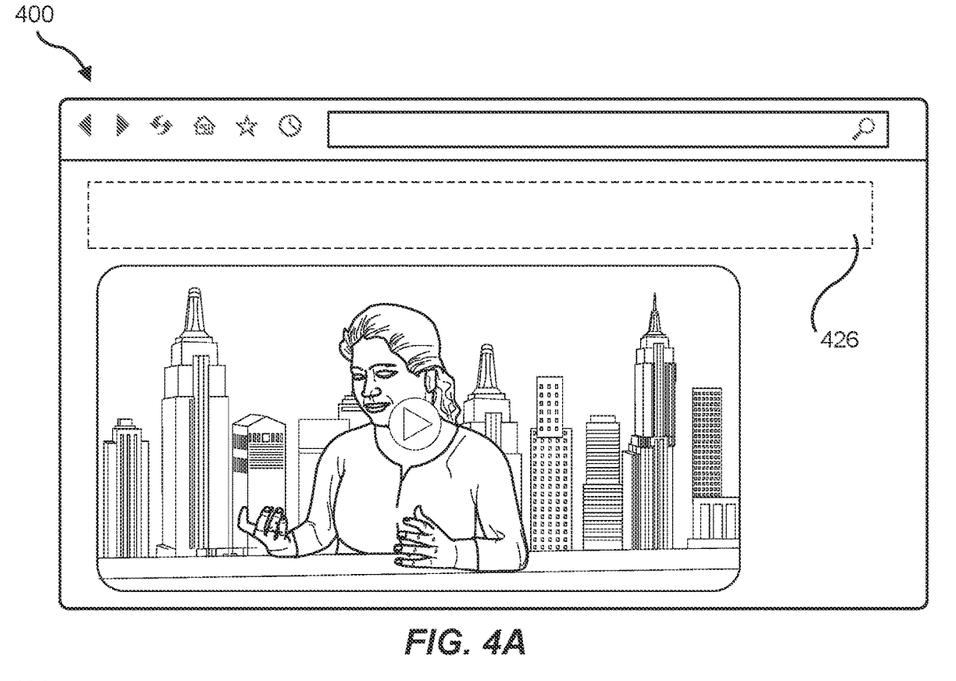
FIGS. 4A-B are example browser screens for removing whitespace from blocked resources in websites.

FIG. 4A illustrates an example browser screen of a website 400 having at least one blocked resource (e.g., an advertisement). As will be explained further herein, website 400 may include a whitespace element 426 (which may correspond to selected element 126 as will be described further below) having one or more whitespace candidates.

Figure 5:
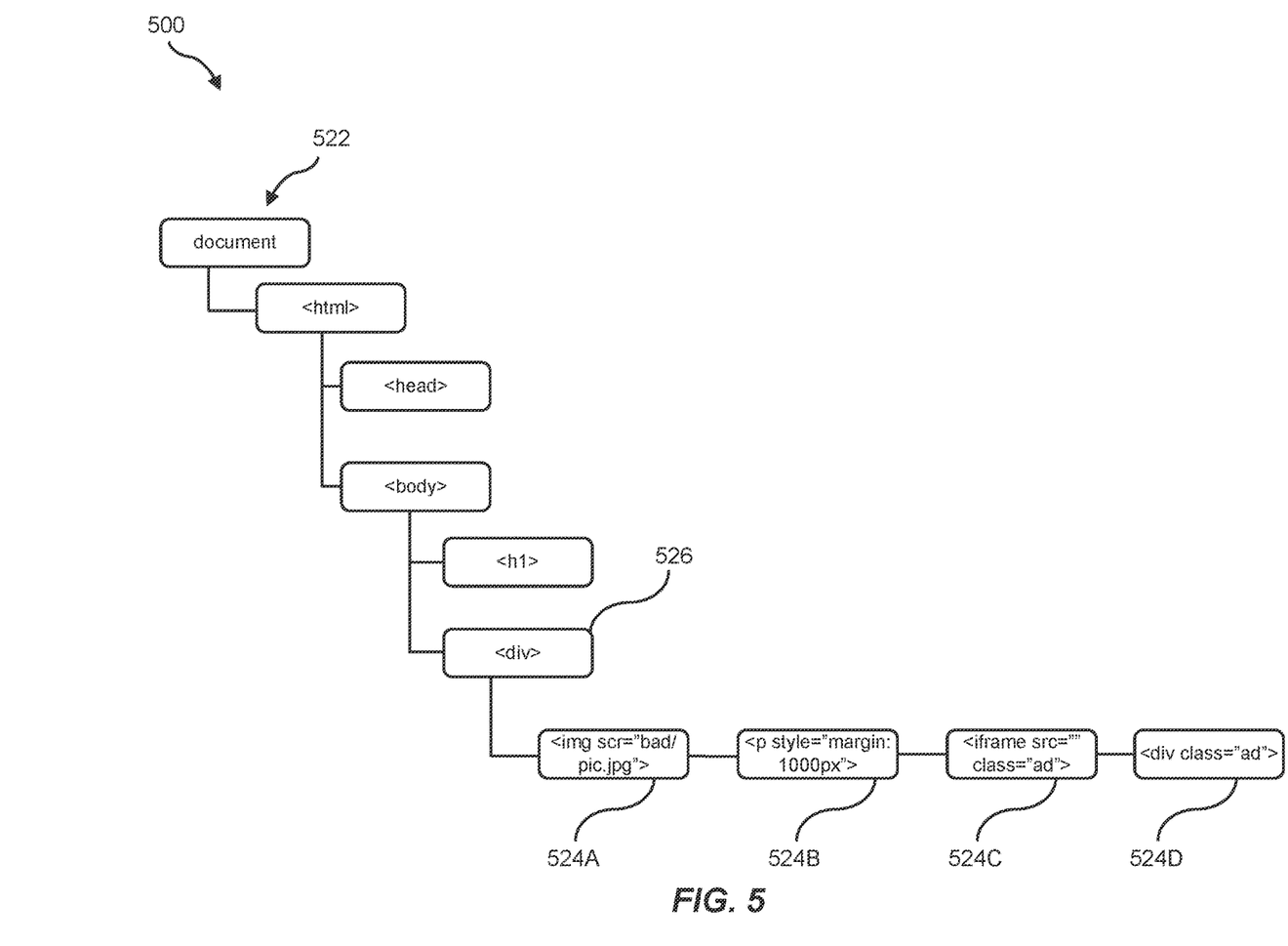
FIG. 5 is an example element hierarchy for removing whitespace from blocked resources in websites.

FIG. 5 illustrates a diagram of an example hierarchy 500 of various document elements 522 (which may correspond to document elements 122). Hierarchy 500 may correspond to a document object model (DOM) of a website, such as website 400. For example, website 400 may include various document elements based on the DOM such as hierarchy 500. A browser may parse hierarchy 500 to render and display website 400 as shown in FIG. 4A.

Further, as shown in FIG. 4A, certain elements may not have been loaded. Certain resources may have been blocked from being loaded, such as elements including errors, elements recognized as advertisements and/or malicious, etc. Blacklist 132 may include a list of blocked domains. Certain resources may have not yet loaded, such as dynamic resources that may be loaded as a user browses website 400.

Returning to method 300, at step 304 one or more of the systems described herein may identify, from the plurality of elements, one or more whitespace candidates to be displayed as whitespace in the browser. For example, identification module 104 may, as part of computing device 202 in FIG. 2, identify whitespace candidates 124 from document elements 122.

FIG. 4A illustrates how whitespace element 426 may be displayed as whitespace or empty space that may not contain actual content but may cause content to be displayed around (e.g., under in FIG. 4A) the empty space. Although whitespace element 426 may not materially affect a functionality of website 400, the user may notice how the content of website 400 may appear unnecessarily offset. In addition, although FIG. 4A illustrates whitespace element 426 along a top of website 400 (e.g., akin to a banner ad), in other examples, whitespace element 426 may be located in other areas, such as along a side, between portions of content, etc.

FIG. 5 illustrates examples of a whitespace candidate 524A, a whitespace candidate 524B, a whitespace candidate 524C, and a whitespace candidate 524D (which may correspond to whitespace candidates 124). Identification module 104 may identify whitespace candidates that may be disabled without materially affecting the website's functionality (e.g., are unnecessary whitespace) based on one or more characteristics of document elements 522.

Identification module 104 may identify whitespace candidates based on identifying elements originating from a blocked domain. A domain may be blocked to prevent loading of advertisements, malicious components, etc. Blacklist 132 may enumerate blocked domains. Elements loading resources from a blocked domain may be prevented from loading the resources such that the elements no longer include any resources. For example, whitespace candidate 524A may include an image that originates from a blocked domain such that whitespace candidate 524A may not include any loadable resource. In addition, as whitespace candidate 524A is associated with a blocked domain, identification module 104 may more readily identify whitespace candidate 524A as having unnecessary whitespace.

Identification module 104 may identify whitespace candidates based on identifying elements covering a threshold amount of the website with whitespace. In some examples, a whitespace element may be small enough so as not to materially affect a rendering layout of a website. Identification module 104 may therefore determine whether a whitespace element covers the threshold amount, which may be defined as a percent (e.g., 25% or other appropriate percent of the website's viewable area), size of the element (e.g., as measured in pixels), and/or relative to other elements (e.g., comparing sizes relative to non-whitespace elements, ranking elements by size, etc.). For example, whitespace candidate 524B may include whitespace in an order of magnitude of thousands of pixels such that whitespace candidate 524B satisfies the threshold amount.

Identification module 104 may identify whitespace candidates based on identifying elements having empty body content. As described herein, an element having blocked resources may result in an element having empty body content. Because an element with empty body content may likely not have a functional use for the website, such an element may correspond to unnecessary whitespace. For example, whitespace candidate 524C may not include any body content because its source may have been removed as a blocked domain. Thus, identification module 104 may more readily identify whitespace candidate 524C as having unnecessary whitespace.

Identification module 104 may identify whitespace candidates based on identifying elements sharing a same class with an empty element. An advertisement or other blocked resource may be associated with multiple elements that may share the same class or other attributes. For example, whitespace candidate 524D may share the same class as whitespace candidate 524C. Because of the known association with a blocked resource, identification module 104 may more readily identify whitespace candidate 524D as a whitespace candidate.

Alternatively or in addition, identification module 104 may identify whitespace candidates using a combination of the above-mentioned factors. For example, identification module 104 may weigh each of the factors to identify whitespace candidates. As described above, certain elements may exhibit more than one of the factors.

Turning back to FIG. 3, at step 306 one or more of the systems described herein may select an element of the plurality of elements relating to the one or more whitespace candidates based on the hierarchy. For example, selection module 106 may, as part of computing device 202 in FIG. 2, select, from document elements 122, selected element 126 relating to whitespace candidates 124 based on the hierarchy of document elements 122.

Selection module 106 may select selected element 126 to facilitate observation of selected element 126, as will be described further below. Although each of whitespace candidates 124 may be selected and observed, in some examples it may be possible to observe multiple whitespace candidates by selecting a shared parent element. Therefore, selection module 106 may select selected element 126 by selecting an element having children, based on the hierarchy, that are all included in the one or more whitespace candidates.

FIG. 5 illustrates one example of how selection module 106 may select selected element 526 (which may correspond to selected element 126 and/or whitespace element 426). Selection module 106 may successively check, starting from a highest level of the hierarchy, a lower level in the hierarchy to identify the element having children that are all included in the one or more whitespace candidates. For instance in FIG. 5, selection module 106 may start at the highest level (e.g., "document") and successively check lower levels (e.g., "<html>," "<head>," "<body>," etc.). Selected element 526 may have children (e.g., whitespace candidates 524A-D) that may all be previously identified as whitespace candidates such that selection module 106 may select selected element 526.

At step 308 of method 300, one or more of the systems described herein may establish a mutation observer for monitoring a change in the selected element. For example, observer module 108 may, as part of computing device 202 in FIG. 2, establish mutation observer 128 for monitoring a change in selected element 126.

As described herein, certain whitespace elements may correspond to an empty element reserved for dynamically loading resources as the user browses. Removal of such reserved empty elements may break the website's functionality and adversely affect the user's browsing experience. To mitigate this adverse effect, the whitespace elements may be disabled rather than removed. For example, mutation observer 128, which may correspond to observer module 108 and/or may be implemented as a browser component and/or a script, may set a display attribute of selected element 126 to not display.

Figure 4B:
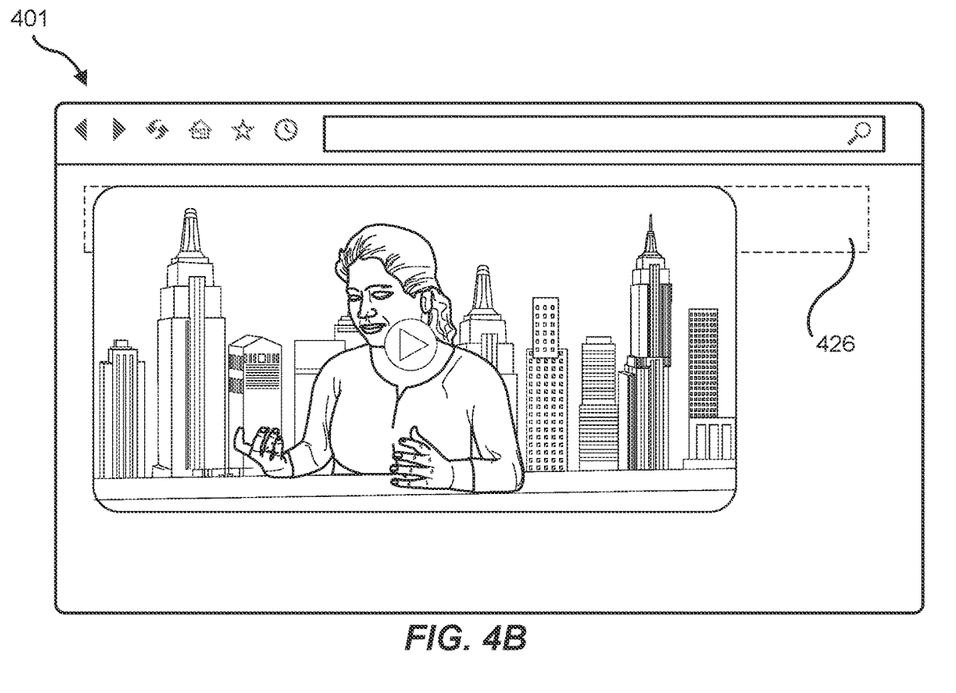

FIG. 4B illustrates a website 401 that corresponds to website 400. In FIG. 4B, mutation observer 128 has set the display attribute of whitespace element 426 to not display such that the content of website 401 may not be offset or otherwise visually impacted by whitespace element 426. Mutation observer 128 may monitor for changes in whitespace element 426. In particular, mutation observer 128 may monitor for whitespace element 426 and/or its children, to load any unblocked, renderable resources.

Returning to FIG. 3, at step 310 one or more of the systems described herein may modify a display attribute of the selected element based on the monitoring by the mutation observer. For example, modification module 110 may, as part of computing device 202 in FIG. 2, modify the display attribute of selected element 126 based on the monitoring by mutation observer 128.

As described above, mutation observer 128 may have previously set the display attribute of selected element 126 to not display. In some examples, selected element 126 or a child element thereof may subsequently load non-blocked content that may be rendered. Mutation observer 128 may then set the display attribute of selected element 126 to display to render the non-blocked content and preserve the website's functionality.

In some examples, modification module 110 (which may correspond to observer module 108 and/or mutation observer 128) may disable and/or terminate mutation observer 128. After selected element 126 loads non-blocked content, selected element 126 may no longer be identified as unnecessary whitespace such that mutation observer 128 may no longer be needed to monitor selected element 126.

As explained above, a browser using security software may block certain resources, such as elements having errors, advertisements, malicious components, etc., from loading in websites. Such blocked resources may result in empty HTML elements which the browser may render as empty spaces covering part of the website. Although these empty HTML elements may not functionally break the website, the user's experience may be diminished.

The whitespace removal system described herein may automatically detect the empty spaces generated due to blocked resources and visually remove the empty spaces to offer the user a cleaner, more usable final website. During a detection phase, the whitespace removal system may detect potential whitespace elements. For example, the whitespace removal system may check for elements loaded from blocked domains, elements including empty space that may have been reserved for blocked resources, elements having empty body content, and elements having classes associated with blocked resources.

During a solution phase, the whitespace removal system may select elements from the DOM having only whitespace element children, to select as few elements covering all whitespace elements without selecting elements having legitimate content. The whitespace removal system may disable rendering of the selected elements without removing the selected elements. The whitespace removal system may then observe, using for instance a mutation observer, whether the selected elements eventually load legitimate content, at which time the mutation observer may reenable rendering of the selected elements as needed for the legitimate content. Thus, the whitespace removal system may provide a scalable solution for addressing whitespace without requiring customized rules for websites.

Figure 6:
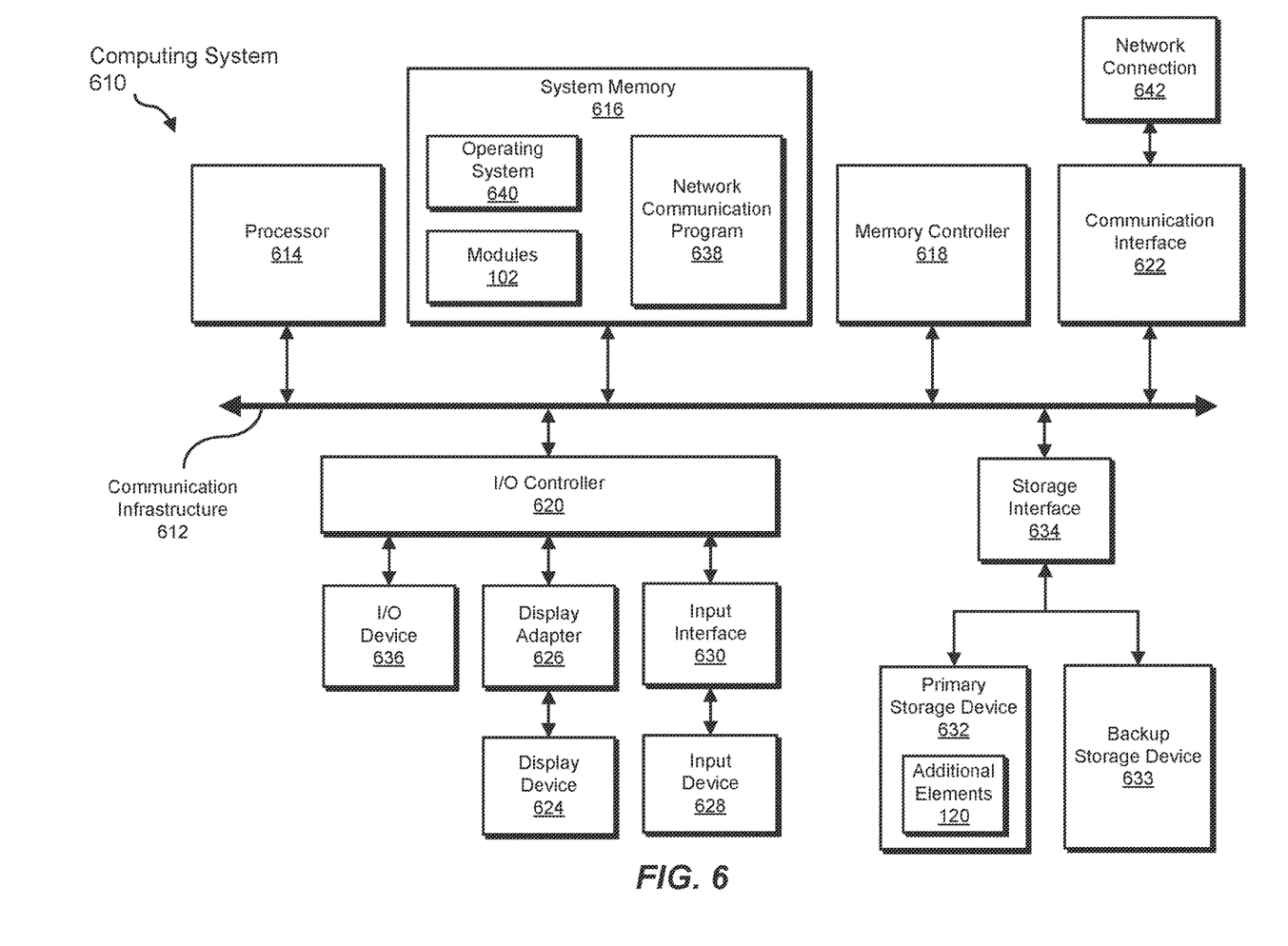
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, one or more of additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
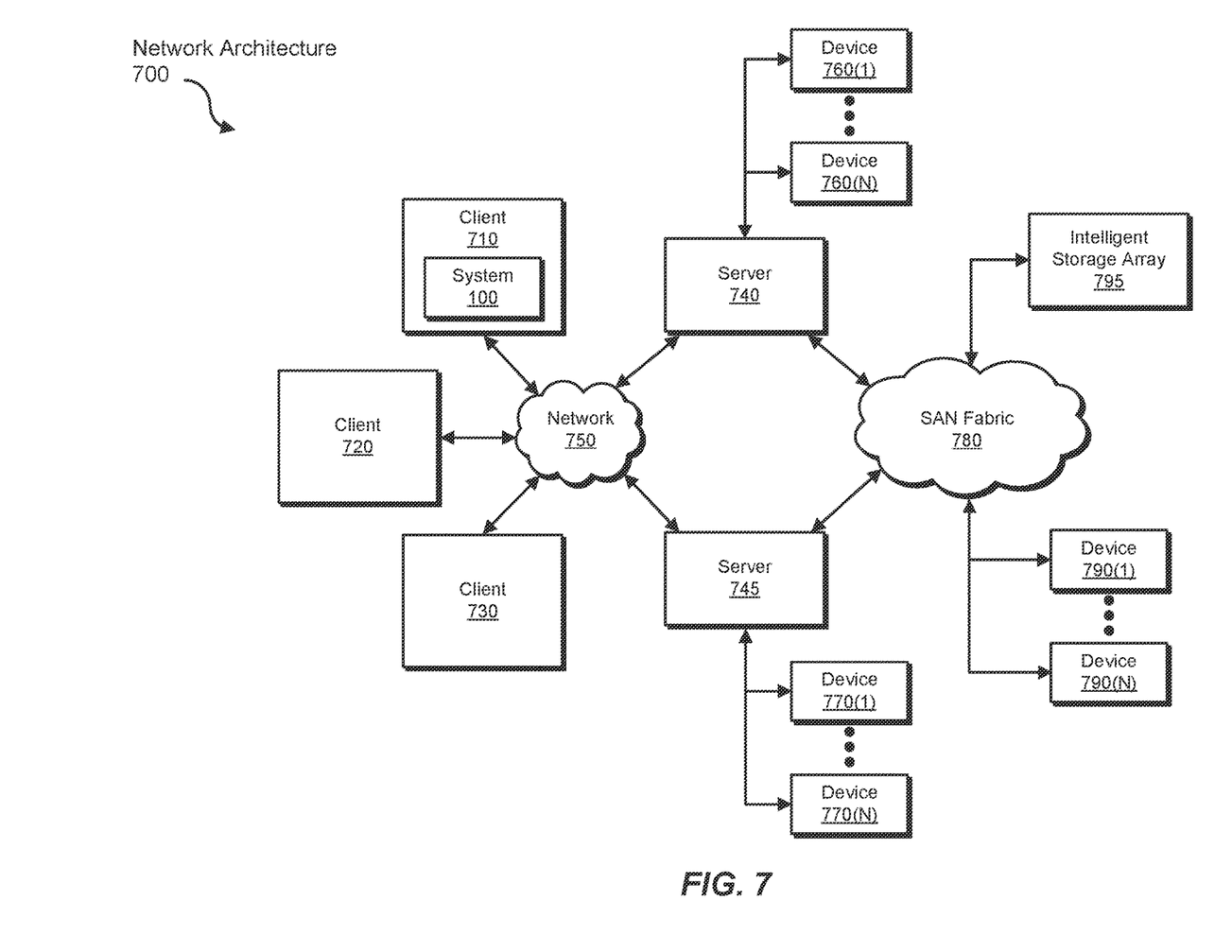
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for removing whitespace from blocked resources in websites.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive element data to be transformed, transform the element data, output a result of the transformation to remove whitespace, use the result of the transformation to monitor the corresponding element, and store the result of the transformation to further update the element. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for removing whitespace from blocked resources in websites, at least a portion of the method being performed by a computing device comprising at least one processor, the method comprising:
   identifying a plurality of elements arranged in a hierarchy from a website at least partially loaded in a browser;
   identifying, from the plurality of elements, one or more whitespace candidates to be displayed as whitespace in the browser based on blocked content;
   selecting an element of the plurality of elements relating to the one or more whitespace candidates based on the hierarchy;
   establishing a mutation observer for monitoring a change in the selected element;
   disabling, by the mutation observer, the selected element by setting a display attribute of the selected element to not display;
   rendering a content of the website without an indication of the selected element such that the content is not visually impacted by the selected element;
   setting, via the mutation observer, the display attribute of the selected element to display when the selected element loads a non-blocked content;
   disabling the mutation observer after the selected element loads the non-blocked content; and
   rendering the content of the website including the selected element.

2. The method of claim 1, wherein determining the one or more whitespace candidates is based on identifying elements originating from a blocked domain.

3. The method of claim 1, wherein determining the one or more whitespace candidates is based on identifying elements covering a threshold amount of the website with whitespace.

4. The method of claim 1, wherein determining the one or more whitespace candidates is based on identifying elements having empty body content.

5. The method of claim 1, wherein determining the one or more whitespace candidates is based on identifying elements sharing a same class with an empty element.

6. The method of claim 1, wherein selecting the element is based on selecting an element having children, based on the hierarchy, that are all included in the one or more whitespace candidates.

7. The method of claim 6, wherein selecting the element comprises successively checking, starting from a highest level of the hierarchy, a lower level in the hierarchy to identify the element having children that are all included in the one or more whitespace candidates.

8. A system for removing whitespace from blocked resources in websites, the system comprising:
   an identification module, stored in memory, configured to identify a plurality of elements arranged in a hierarchy from a website at least partially loaded in a browser and identify, from the plurality of elements, one or more whitespace candidates to be displayed as whitespace in the browser based on blocked content;
   a selection module, stored in memory, configured to select an element of the plurality of elements relating to the one or more whitespace candidates based on the hierarchy;
   an observer module, stored in memory, configured to establish a mutation observer for monitoring a change in the selected element;
   a modification module, stored in memory, configured to disable the selected element by setting a display attribute of the selected element to not display such that a content of the website does not include an indication of the selected element and is not visually impacted by the selected element, to set the display attribute of the selected element to display when the selected element loads a non-blocked content, and to disable the mutation observer after the selected element loads the non-blocked content; and
   at least one physical processor that executes the identification module, the selection module, the observer module, and the modification module.

9. The system of claim 8, wherein determining the one or more whitespace candidates is based on identifying elements originating from a blocked domain.

10. The system of claim 8, wherein determining the one or more whitespace candidates is based on identifying elements covering a threshold amount of the website with whitespace.

11. The system of claim 8, wherein determining the one or more whitespace candidates is based on identifying elements having empty body content.

12. The system of claim 8, wherein determining the one or more whitespace candidates is based on identifying elements sharing a same class with an empty element.

13. The system of claim 8, wherein selecting the element is based on selecting an element having children, based on the hierarchy, that are all included in the one or more whitespace candidates and, wherein selecting the element comprises successively checking, starting from a highest level of the hierarchy, a lower level in the hierarchy to identify the element having children that are all included in the one or more whitespace candidates.

14. A non-transitory computer-readable medium comprising one or more computer-executable instructions that, when executed by at least one processor of a computing device, cause the computing device to:
   identify a plurality of elements arranged in a hierarchy from a website at least partially loaded in a browser;
   identify, from the plurality of elements, one or more whitespace candidates to be displayed as whitespace in the browser based on blocked content;
   select an element of the plurality of elements relating to the one or more whitespace candidates based on the hierarchy;
   establish a mutation observer for monitoring a change in the selected element;
   disable, by the mutation observer, the selected element by setting a display attribute of the selected element to not display;
   render a content of the website without an indication of the selected element such that the content is not visually impacted by the selected element;
   set, via the mutation observer, the display attribute of the selected element to display when the selected element loads a non-blocked content;
   disable the mutation observer after the selected element loads the non-blocked content; and render the content of the website including the selected element.

15. The non-transitory computer-readable medium of claim 14, wherein determining the one or more whitespace candidates is based on at least one of:
  identifying elements originating from a blocked domain;
  identifying elements covering a threshold amount of the website with whitespace;
  identifying elements having empty body content; or
  identifying elements sharing a same class with an empty element.

\* \* \* \* \*